May 5, 1953 P. McDUFF 2,637,111
TANK GAUGING DEVICE
Filed March 27, 1947 2 SHEETS—SHEET 2

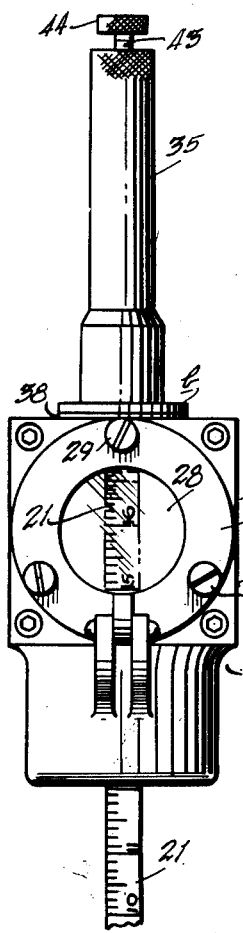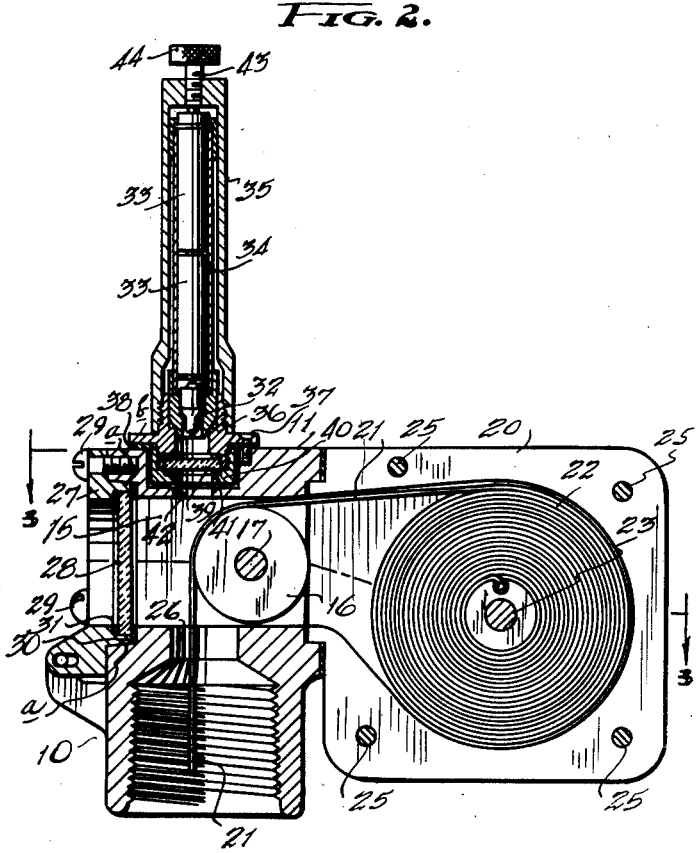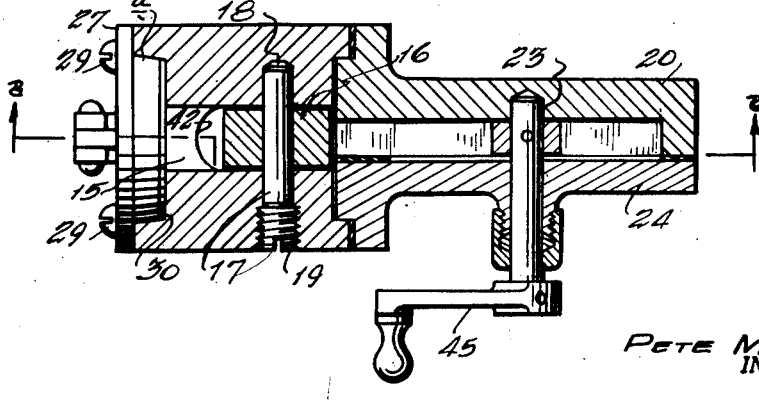

PETE McDUFF
INVENTOR.

BY Cecil L. Wood

ATTORNEY

Patented May 5, 1953

2,637,111

UNITED STATES PATENT OFFICE 2,637,111

TANK GAUGING DEVICE

Pete McDuff, Fort Worth, Tex.

Application March 27, 1947, Serial No. 737,630

1 Claim. (Cl. 33—126.5)

This invention relates to gauging apparatus for oil storage tanks, and it has particular reference to a device for gauging the contents of tanks of large capacity, and its principal object resides in the provision of apparatus by which oil levels in storage can be readily determined with a minimum of effort and safety at all hours and such operation can be performed without releasing the gases from the tank.

An object of the invention is that of providing a flexible, enclosed gauging tape adapted to be reeled and unreeled within a sealed housing in which a glazed viewing port is provided through which the gauge can be observed and accurate readings taken without exposing the observer to dangerous gases from the tank or subjecting the gauge to wind pressures which tend to impair the accuracy of the gauge and scatter the oil.

A still further object of the invention resides in the provision of a gauging device for oil tanks which can be installed with economy and afford a ready means for measuring the tank contents without the use of tools, or other instruments, for opening thief holes, valves, or the like, through which to lower a gauge line.

Another object of the invention resides in the provision of means for illuminating the interior of the sealed gauge housing whereby to afford adequate visibility of the gauge for accurate readings.

Broadly, the invention contemplates the provision of a tank gauging apparatus which is completely self-contained and includes a manually actuated gauge wiping mechanism embodied in the housing by which oil adhering to said gauge is freed therefrom, as the latter is reeled upwardly, and caused to drain back into the tank.

While the foregoing objects are paramount, other and lesser objects will become manifest as the description proceeds, taken in connection with the appended drawings wherein:

Figure 1 is a front elevational view of the gauge housing, showing the glazed viewing port therein and illustrating the flexible gauge.

Figure 2 is a vertical sectional view of the invention, taken on lines 2—2 of Figure 3, showing the reeled gauge and lamp.

Figure 3 is a lateral cross-sectional view of the invention, taken on lines 3—3 of Figure 2, showing the reel crank.

Figure 4:
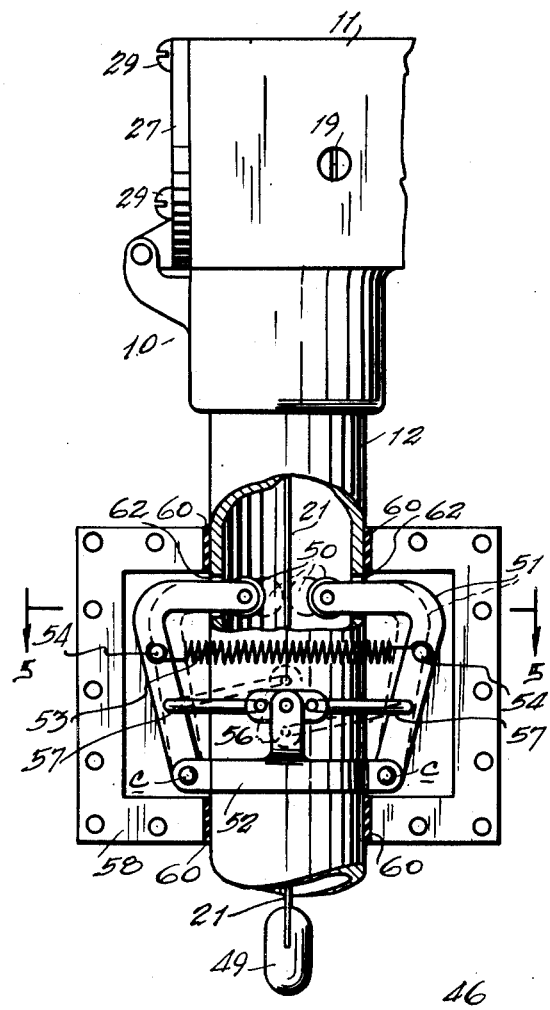
Figure 4 is a fragmentary elevational view of the invention illustrating the gauge wiping mechanism, a part of the housing therefor being shown removed.

The invention includes a sealed housing 10 which may be of any desired form but which is illustrated as being rectangular in its main body portion 11 and has a depending interiorly threaded portion by which the housing 10 is coupled to the upper end of a tube 12 whose lower end is threaded into the top of a gate valve 13 arranged in the top or head 14 of a conventional storage tank (not shown).

The housing 10 has a relatively narrow passage 15 arranged horizontally therethrough, of greater height than width, as shown in Figures 2 and 3, and a roller 16 is pivotally supported in the passage 15 by a pin 17 arranged through one wall of the housing 10 and extending into a bore 18 in the opposite wall. The head 19 of the pin 17 is threaded into the housing wall, as shown in Figure 3.

The passage 15 is open to the rear of the housing 10 to which is secured a casing 20 for a flexible steel gauge line 21 arranged on a reel 22 on a pivot 23. The casing 20 is closed by a plate 24 secured by screws 25, or the like. The gauge line 21 is operatively arranged over the roller 16 in the passage 15 and down through a port 26 in the bottom of the housing 10 and extending through the tube 12 and the valve 13, when the latter is opened, into the tank below, as in Figures 4 and 6.

The front of the housing 10 is closed by a hinged closure 27 in which is arranged a transparent disk 28 through which the gauge line 21 can be viewed, as in Figures 1 and 2. The closure 27 is secured by a plurality of suitable screws 29 and is sealed by a gasket 30 around the seat $a$. Another gasket 31 affords an additional seal about the disk 28.

A battery energized lamp 32 is provided to illuminate the interior of the housing 10 and is directed upon the gauge line 21 therein to afford adequate visibility under all conditions. The lamp 32 and its batteries 33 are encased within a tubular casing 34 which is enclosed in a larger casing 35 whose lower end is threaded upon a flanged connector 36 secured by screws 37 to the top of the housing 10. A gasket 38 provides a seal between the flange $b$ and the housing 10.

A glass disk 39 is secured in the lower end of the casing 35 by a retainer ring 40 and sealed by gaskets 41 on each side. An opening 42 in the top of the housing 10 admits light to the passage 15 therein. The lamp 32 is operated by a screw 43 threaded into the top of the casing 35 and having a knurled head 44. As the gauge line 21 is reeled or unreeled by the crank 45, therefore, it will pass over the roller 16 before the glazed opening 28 and be viewable therethrough.

Figure 6:
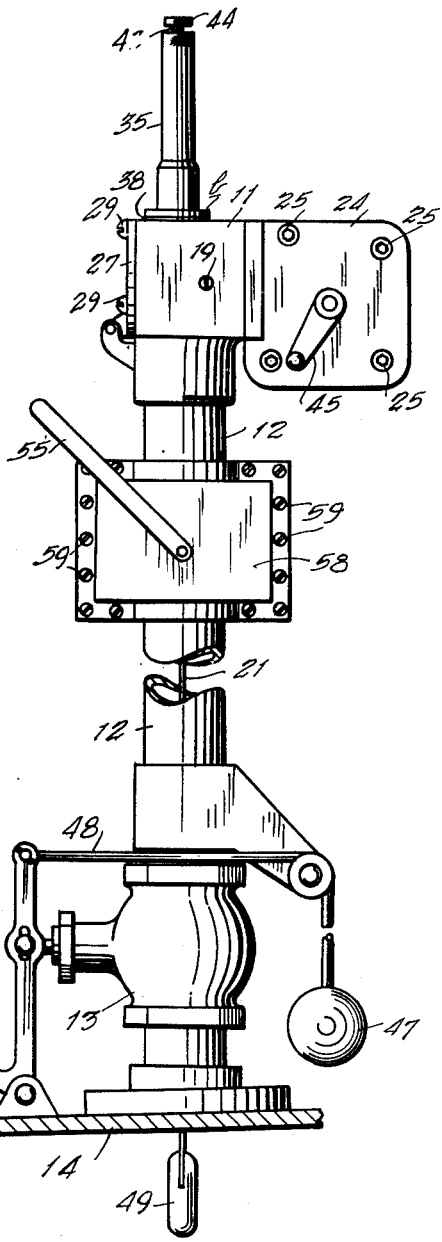
Figure 6 illustrates the invention, in side elevation, shown supported on a foot actuated gate valve on a tank head.

It is essential, for safety and the conservation of gas pressures in the tank, to properly seal the apparatus in the manner described and shut off the pressures therebelow by the slide or gate valve 13, shown in Figure 6, which is operated by the foot pedal or lever 46 in cooperation with the weight 47 connected by the cable 48 to the lever 46. Thus, when the gauge line 21 is lowered into the tank, aided by a weight 49 on its lower end, the valve 13 must obviously be open.

Figure 5:
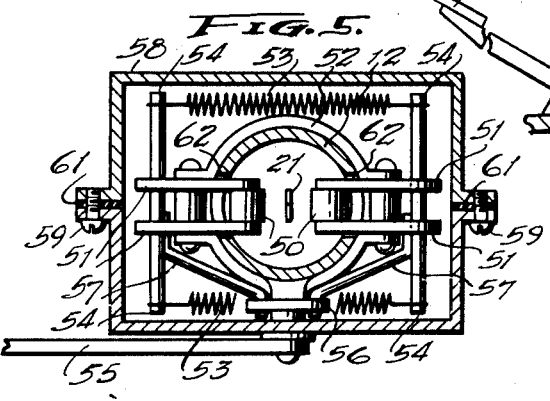
Figure 5 is a lateral cross-sectional view through the wiper housing, taken on lines 5—5 of Figure 4, showing the wiping mechanism in plan.

The line 21 is operated between wiping members 50, such as rollers, or suitable stationary devices, which may be attached to the inner opposing ends of inverted L-shaped levers 51, illustrated in Figures 4 and 5, pivoted at their lower ends at c to a clamp 52 secured about the tube 12. A tension spring 53 is arranged on each side of the levers 51, their ends being attached to the ends of pins 54 extending from each lever 51 in the manner shown in Figures 4 and 5. The wiping elements 50 are retained, under the tension of the springs 53, against the line 21.

When the lever 55 is actuated to rotate the link 56, to the ends of which are connected rods 57, each having operative connection with one of the levers 51, the wiping elements 50 are spaced to permit the free passage of the line 21, as illustrated in Figures 4 and 5. In operating the mechanism to wipe the line 21 the lever 55 is moved to cause the parts to assume the dotted line positions illustrated in Figure 4.

The entire wiping assembly is enclosed within a housing 58 formed in two identical parts and connected about the tube 12 by screws 59, or the like, gaskets 60 and 61 being provided to effect the proper seal. The levers 51 operate through vertically arranged slots 62 in each side of the tube 12.

In operation, therefore, a reading is taken by first opening the valve 13, as by pressure upon the pedal member 46, shown in Figure 6, so that the tape 21 can pass therethrough. The body portion 11 of the housing 10 should be illuminated by operating the lamp 32 whereupon the tape 21 is lowered into the tank until the weight 49 on the tape reaches the bottom of the tank. After a brief interval the tape 21 is rewound upon the reel 22, by rotating the latter by the crank 45, and is observed through the glazed opening 28 to determine the point where the oil coating on the tape occurs and noting the depth measurement in the tank.

At this point the reel 22 is reversed to lower the tape 21 a few inches so that the oil coating thereon is below the wiping elements 50 whereupon these members are closed upon the tape 21, by manipulating the lever 55, and the tape is then wound upon the reel 22 until the lower end of the tape 21, with its weight 49, is above the valve 13 which is then closed. The wiping elements 50 are preferably released at this stage.

Manifestly, the structure herein shown and described is capable of considerable changes and modifications by persons skilled in the art without departing from the spirit and intent of the invention or the scope of the appended claim.

What is claimed is:

In a gauging device for oil tanks for installation in a tank head having a gate valve therein and a tube threadedly secured in the upper end of said valve, in combination, a rectangular housing formed with an interiorly threaded cylindrical portion for securement to the upper end of said tube, the said housing defining a horizontal passage therethrough, a glazed closure for one end of said passage, a detachable casing secured to said housing having a chamber therein open to said passage, a reel rotatably mounted in said chamber having a graduated tape thereon extending through said passage, a roller in said passage supporting said tape to depend concentrically through said tube, a weight carried by the free end of said tape and a crank externally of said detachable casing for rotating said reel to move said tape before said glazed opening.

PETE McDUFF.

References Cited in the file of this patent

UNITED STATES PATENTS

| Number | Name | Date |
|---|---|---|
| 577,503 | Ash | Feb. 23, 1897 |
| 1,823,801 | Hiatt | Sept. 15, 1931 |
| 2,006,301 | Meyer | June 25, 1935 |
| 2,102,615 | Cubete | Dec. 21, 1937 |
| 2,158,936 | Hennings | May 16, 1939 |
| 2,226,060 | Johnson | Dec. 24, 1940 |
| 2,282,774 | Wiggins | May 12, 1942 |
| 2,345,054 | Korevec | Mar. 28, 1944 |
| 2,356,347 | Parsons | Aug. 22, 1944 |

FOREIGN PATENTS

| Number | Country | Date |
|---|---|---|
| 291,676 | Great Britain | June 7, 1928 |